(12) United States Patent
Jenkins et al.

(10) Patent No.: US 12,567,889 B2
(45) Date of Patent: Mar. 3, 2026

(54) ITERATIVE MIMO DETECTION USING STOCHASTIC SAMPLING

(71) Applicant: L3Harris Technologies, Inc., Melbourne, FL (US)

(72) Inventors: Stephen N. Jenkins, Layton, UT (US); Behrouz Farhang, Salt Lake City, UT (US)

(73) Assignee: L3Harris Technologies, Inc., Melbourne, FL (US)

( * ) Notice: Subject to any disclaimer, the term of this patent is extended or adjusted under 35 U.S.C. 154(b) by 5 days.

(21) Appl. No.: 18/793,560

(22) Filed: Aug. 2, 2024

(65) Prior Publication Data

US 2025/0253903 A1     Aug. 7, 2025

Related U.S. Application Data

(60) Provisional application No. 63/550,548, filed on Feb. 6, 2024.

(51) Int. Cl.
    *H04L 1/02*        (2006.01)
    *H04B 7/0456*     (2017.01)

(52) U.S. Cl.
    CPC ................................. *H04B 7/0456* (2013.01)

(58) Field of Classification Search
    CPC ......... H04B 7/0456; H04B 1/707; H04L 1/06; H04L 25/0242; H04L 25/0256
    USPC ................................. 375/267, 260, 262, 299
    See application file for complete search history.

(56) References Cited

U.S. PATENT DOCUMENTS

| | | | |
|---|---|---|---|
| 6,134,277 A | 10/2000 | Shah | |
| 6,144,711 A * | 11/2000 | Raleigh | H04B 7/0854 |
| | | | 375/349 |
| 7,317,770 B2 | 1/2008 | Wang | |
| 7,457,367 B2 | 11/2008 | Farhang-Boroujeny | |
| 7,590,195 B2 | 9/2009 | Wang | |
| 7,813,438 B2 | 10/2010 | Farhang-Boroujeny | |

(Continued)

OTHER PUBLICATIONS

B. Hochwald and S. ten Brink, "Achieving near-capacity on a multiple-antenna channel," IEEE Transactions on Communications, vol. 51, No. 3, pp. 389-399, 2003.

(Continued)

*Primary Examiner* — Khai Tran
(74) *Attorney, Agent, or Firm* — Fox Rothschild LLP; Carol E. Thorstad-Forsyth

(57) ABSTRACT

A method of recovering transmitted symbols. The method receiving a signal comprising a codeword, the signal having been affected by channel effects including distortion and noise. A solution space for recovering the transmitted symbols is identified, including finding a sampling center using a full matrix W for minimum mean square error. A vector v' is generated to generate noise. The vector has a variance $\rho\sigma_n^2$ where $\sigma_n^2$ is a factor that defines power of added noise and where $\rho$ is a scaling parameter that controls a size of a noise sampleable space. The vector v' is applied to the solution space. Original samples are gathered from the solution space, which includes noise from the vector v' and symbol information from the received signal to find probabilities for symbols. Using the probabilities, the symbols are recovered.

20 Claims, 3 Drawing Sheets

(56) References Cited

U.S. PATENT DOCUMENTS

| | | | |
|---|---|---|---|
| 8,094,707 B1 | 1/2012 | Nammi et al. | |
| 10,819,468 B2 | 10/2020 | Rezazadehreyhani | |
| 2003/0147455 A1 | 8/2003 | Simoni et al. | |
| 2006/0193411 A1 | 8/2006 | Chou et al. | |
| 2008/0165865 A1 | 7/2008 | Bar-Ness et al. | |
| 2012/0243630 A1* | 9/2012 | Golovins | H04B 17/345 |
| | | | 375/260 |
| 2012/0263222 A1 | 10/2012 | Wang | |
| 2014/0314137 A1 | 10/2014 | Lakkis | |

OTHER PUBLICATIONS

Z. Guo and P. Nilsson, "Algorithm and implementation of the K-best sphere decoding for MIMO detection," IEEE Journal on Selected Areas in Communications, vol. 24, No. 3, pp. 491-503, 2006.

J. C. Hedstrom, A. Rezazadehreyhani, C. H. Yuen, and B. Farhang-Boroujeny, "A capacity achieving MIMO detector based on stochastic sampling," IEEE Open Journal of the Communications Society, vol. 2, pp. 2436-2448, 2021.

R.-r. Chen, R. Peng, A. Ashikhmin, and B. Farhang-Boroujeny, "Approaching MIMO capacity using bitwise Markov chain Monte Carlo detection," IEEE Transactions on Communications, vol. 58, No. 2, pp. 423-428, 2010.

H. Vikalo, B. Hassibi, and T. Kailath, "Iterative decoding for MIMO channels via modified sphere decoding," IEEE Transactions on Wireless Communications, vol. 3, No. 6, pp. 2299-2311, 2004.

C. Studer and H. B·· olcskei, "Soft-input soft-output single tree-search sphere decoding," IEEE Transactions on Information Theory, vol. 56, No. 10, pp. 4827-4842, 2010.

Tüchler et al., "Minimum mean squared error equalization using a priori information," IEEE Transactions on Signal Processing, vol. 50, No. 3, pp. 673-683 (2002).

Tüchler et al., "Turbo equalization: principles and new results," IEEE Transactions on Communications, vol. 50, No. 5, pp. 754-767 (2002).

Vikalo et al., "Sphere-constrained ML detection for frequency-selective channels," IEEE Transactions on Communications, vol. 54, No. 7, pp. 1179-1183 (2006).

Wu and Zheng, "Low complexity soft-input soft-output block decision feedback equalization," IEEE Journal on Selected Areas in Communications, vol. 26, No. 2, pp. 281-289 (2008).

Yin et al., "Soft-Input Soft-Output Block Decision Feedback Equalization for ISI Channels," IEEE Transactions on Communications, vol. 69, No. 9, pp. 6213-6224 (2021).

* cited by examiner

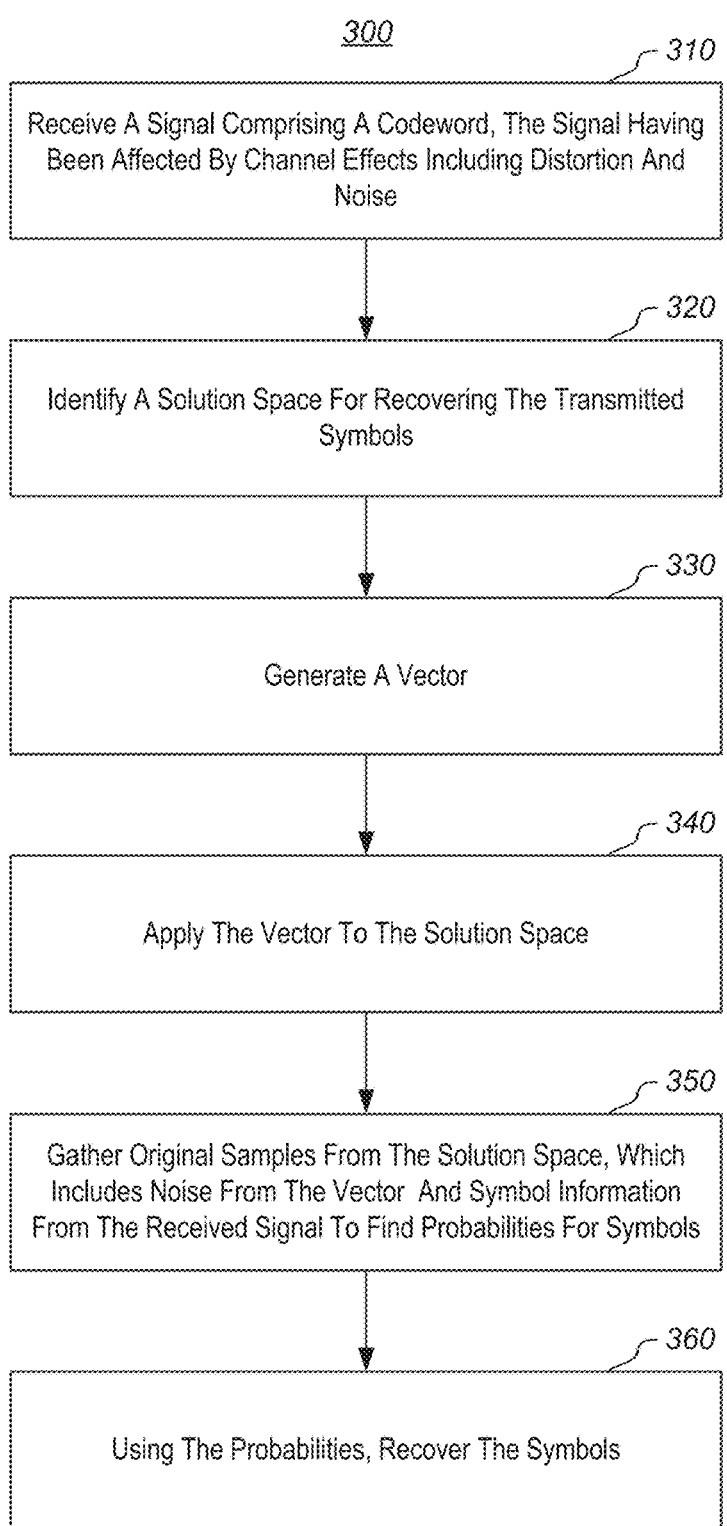

*300*

*310*

Receive A Signal Comprising A Codeword, The Signal Having Been Affected By Channel Effects Including Distortion And Noise

*320*

Identify A Solution Space For Recovering The Transmitted Symbols

*330*

Generate A Vector

*340*

Apply The Vector To The Solution Space

*350*

Gather Original Samples From The Solution Space, Which Includes Noise From The Vector And Symbol Information From The Received Signal To Find Probabilities For Symbols

*360*

Using The Probabilities, Recover The Symbols

*Figure 3*

ITERATIVE MIMO DETECTION USING STOCHASTIC SAMPLING

CROSS-REFERENCE TO RELATED APPLICATIONS

This application claims the benefit of and priority to U.S. Provisional Patent Application Ser. No. 63/550,548 filed on Feb. 6, 2024 and entitled "ITERATIVE MIMO DETECTION USING STOCHASTIC SAMPLING," and which application is expressly incorporated herein by reference in its entirety.

BACKGROUND

Background and Relevant Art

Digital communication techniques have rapidly evolved in recent times. Such digital communications can be performed over wired or wireless channels. Wireless communications are described as "over-the-air" communications.

One area of innovation in communication systems is bandwidth capacity. In particular, there is research and innovation directed to increasing the data rate that data can be transmitted on a given channel. That is, research is directed to methods and systems that can be used for increasing capacity for transmitting more data on a channel during a particular period of time than was previously known to be possible.

One method that has been used to increase channel capacity is referred to as multiple-input and multiple-output (MIMO). MIMO exploits multipath propagation to increase channel capacity. This may be referred to as spatial multiplexing. Multipath propagation refers to the phenomenon of radio signals from a source transmitter reaching a destination receiver via two or more different paths. This may be due to signals reflecting off of: obstacles, the atmosphere, bodies of water, etc.; refraction from the atmosphere or bodies of water; etc. A MIMO transmitter may choose to transmit multiple streams of data from an M point quadrature amplitude modulated (QAM) constellation in parallel through different transmit antennas.

On the receiver side, detection of multiple streams via multiple paths results in significant complexity being required to detect and decode transmitted data. In particular, transmitted data is often encoded with an error correction code or error correcting code (ECC) implementing forward error correction (FEC). As data is transmitted, portions of the data may be lost due to channel effects including distortion and noise. Using FEC techniques, codewords are created at the transmitter from the payload data. The codewords are transmitted on the channel, where they may become corrupted by the channel effects causing loss of bits in the codewords. Codewords received and detected at the receiver, even though corrupted by losing bits, can be decoded at the receiver to obtain the payload data. In particular, the receiver can perform decoding, sometimes including a soft-decision algorithm, to extract valid data from a detected codeword. However, each additional spatial stream in a MIMO system compounds the number of computations needed in the receiver at an exponential rate.

In particular, iterative, maximum-a-posteriori (MAP) based receivers have been shown to approach the channel capacity for MIMO channels by sharing soft information of the transmitted bits between a detector and a channel decoder. However, optimal implementations of such receivers have a complexity that grows exponentially with the number of streams and modulation order of the transmitted signal. MAP detectors produce soft information, in the form of log-likelihood ratio (LLR) values, that are then passed to an outer channel decoder as extrinsic information. The decoder, using known information about the channel code, refines the LLR values, which are then fed back to the detector as a priori information for the received coded bits. This method is repeated until either 1) no more new information can be generated, or 2) the latency constraint of the system is met. The effectiveness of MAP-based receivers centers on the ability of the detector to reliably generate accurate LLR values of the transmitted bits.

A naive solution for obtaining the LLR values is to exhaustively search over the set of all possible bits in each MIMO channel, the full solution space generally being denoted as $\mathbb{X}$. However, this can be infeasible for certain systems. For example, a 16-QAM modulation, 4×4 MIMO system has $16^4=65,536$ solutions. A 16-QAM modulation, 8×8 MIMO system has $16^8=4,294,967,296$ solutions. Complexity grows exponentially with the number of streams and modulation order.

Several techniques have been explored to deal with this complexity, each with their own drawbacks. List based techniques, such as the Sphere Decoder, reduce the search space for possible solutions, thus reducing search time and system latency, but reducing the search space in such a way as to still include the maximum likelihood solution (as indicated by LLR) is difficult. The search area in the Sphere Decoder solution is ambiguous and may lead to unsustainable system latencies if not bounded, but bounded methods do not provide the optimal solution. Bounded methods, such as the K-Best algorithm, implement a search-tree pruning method to achieve reduced and known complexity, but cannot guarantee the selection of the maximum likelihood solution. K-Best is also a sequential search algorithm with multiple costly sorting steps.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that includes acts for recovering transmitted symbols. The method includes receiving a signal comprising a codeword, the signal having been affected by channel effects including distortion and noise. A solution space for recovering the transmitted symbols is identified, including finding a sampling center using a full matrix W for minimum mean square error. A vector v' is generated to generate noise. The vector has a variance $$p\sigma_n^2 \text{ where } \sigma_n^2$$

is a factor that defines power of added noise and where ρ is a scaling parameter that controls a size of a noise sampleable space. The vector v' is applied to the solution space. Original samples are gathered from the solution space, which includes noise from the vector v' and symbol information from the received signal to find probabilities for symbols. Using the probabilities, the symbols are recovered.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates a method of recovering symbols.

DETAILED DESCRIPTION

Embodiments illustrated herein identify a subset of highly likely solutions (as indicated by some predetermined criteria), denoted as $\mathbb{L}$ for the full solution space, denoted as $\mathbb{X}$ using a Maximum a posteriori (MAP) detection. The subset of solutions $\mathbb{L}$, are the choices of s (a vector of symbols, where the vector of symbols may be referred to herein as a codeword) that minimize $\|y-Hs\|^2$, which is the maximum likelihood solution. Note that in this context, $\|y-Hs\|^2$ defines a sphere of 'best guesses'. The set of solutions $\mathbb{L}$ can be used to recover transmitted symbols. Embodiments stochastically sample the full solution space in a vicinity of the minimum mean square error (MMSE). In one specific example, this is performed by performing the following:

Find a sampling center: $s_{center}=Wy$ where W is chosen to be the MMSE estimator matrix $$W = (H^H H + \sigma_n^2 I) H^H.$$

Generate a vector $v=Wv'$ where $v'$ is a vector of independent and identically distributed Gaussian elements with zero mean and variance $\rho\sigma_n^2$ where $\rho$ is a scaling parameter that controls the size of the sampling area. Note that experimentation has shown $\rho=4$ to be a particularly useful in that it has been shown to Generate a stochastic sample $\hat{s}=\lfloor s_{center}+v\rfloor$ where $\lfloor\cdot\rfloor$ denotes a hard decision to a closest valid constellation point.

Using the stochastic samples, find a log likelihood ratio (LLR), or soft information of bits using:

$$\lambda_k^e \approx \frac{1}{2}\max_{x\in\mathbb{L}^{k+}}\left\{-\frac{1}{\sigma^2}\|y-Hs\|^2 + x_{\backslash k}^T\cdot\lambda_{\backslash k}^a\right\} - \tag{1}$$

$$\frac{1}{2}\max_{x\in\mathbb{L}^{k-}}\left\{-\frac{1}{\sigma^2}\|y-Hs\|^2 + x_{\backslash k}^T\cdot\lambda_{\backslash k}^a\right\}$$

Throughout this document, some specialized notations are used for compactness and clarity. Vectors and matrices are expressed with bold fonts and the latter are capitalized. Scalars are indicated by lower and upper case non-bold letters. The removal of the k-th element of a vector x is signified as $x_{\backslash k}$. A bit vector x with the k-th bit forced to +1 or −1 (equivalently, one or zero) is presented as $x^{k+}$ and $x^{k-}$, respectively.

Figure 1:
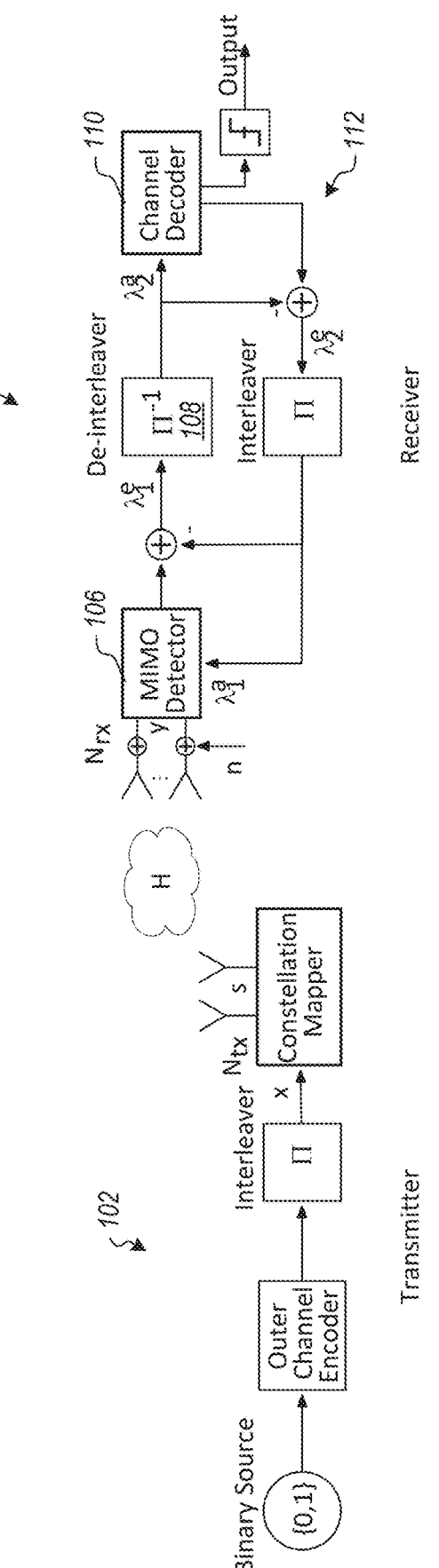
FIG. 1 illustrates a MIMO system including a receiver having iterative maximum-a-posteriori (MAP) detection and decoding.

Referring now to FIG. 1, an example is illustrated. FIG. 1 illustrates a MIMO system 100 including a transmitter 102 and receiver 104. The system 100 can be characterized by y=Hs+n where y is a received signal vector, H is a channel gain matrix, s is the vector of transmitted symbols, and n is the channel noise vector of independent and identically distributed Gaussian elements with zero-mean and variance $\sigma^2$. H denotes the channel gain of size $N_{rx}\times N_{tx}$, $N_{rx}$ and $N_{tx}$ are the number of antennas at the receiver and transmitter, respectively.

In the example illustrated, the receiver 104 is constructed to include an iterative detector 106. A MIMO detector 106 and a channel decoder 110 interact over successive iterations, through a feedback loop 112 to improve on the detection performance.

As used herein, $N_{tx}=N_{rx}=N$.

The receiver 104 includes an iterative MAP detection and decoding system for finding the likelihood of each transmitted bit and improving over successive iterations. The detector 106 collects channel observations y, along with a priori information $$\lambda_1^a,$$

and derives new information $$\lambda_1^e$$

for each transmitted bit, in the form of LLR values. The new information, which is also referred to as extrinsic information, is then de-interleaved by the de-interleaver 108 to become the a priori input $$\lambda_2^a$$

to the channel decoder 110. The channel decoder 110 then performs error correction on the received LLR values and generates extrinsic information $$\lambda_2^e$$

about the transmitted bits. The decoder output $$\lambda_2^e$$

is then interleaved and passed back to the MIMO detector 106 as a priori information $$\lambda_1^a.$$

This process is repeated multiple times to converge.

The effectiveness of the MAP receiver relies upon the accuracy of the LLR values exchanged between the detector 106 and decoder 110. The extrinsic LLR values are defined as $$\lambda_k^e = \ln \frac{P(x_k = +1 \mid y, \lambda_{\backslash k}^a)}{P(x_k = -1 \mid y, \lambda_{\backslash k}^a)} \quad (2)$$

where the subscript k refers to the k-th bit, and subscript \k indicates the removal of the k-th bit. Using Bayes' rule, (2) may be expanded as:

$$\lambda_k^e = \ln \frac{\sum_{x \in \mathbb{X}^{k+}} \left( p(y \mid x) \prod_{j \neq k} p(x_j \mid \lambda_j^a) \right)}{\sum_{x \in \mathbb{X}^{k-}} \left( p(y \mid x) \prod_{j \neq k} p(x_j \mid \lambda_j^a) \right)} \quad (3)$$

Further, using various known methods, (3) can be rearranged as $$\lambda_k^e \approx \frac{1}{2} \max_{x \in \mathbb{X}^{k+}} \left\{ -\frac{1}{\sigma^2} \|y - Hs\|^2 + x_{\backslash k}^T \cdot \lambda_{\backslash k}^a \right\} - \quad (4)$$

$$\frac{1}{2} \max_{x \in \mathbb{X}^{k-}} \left\{ -\frac{1}{\sigma^2} \|y - Hs\|^2 + x_{\backslash k}^T \cdot \lambda_{\backslash k}^a \right\}$$

Here, $\mathbb{X}^{k+}$ and $\mathbb{X}^{k-}$ are the sets of all permutations of x with the k-th bit forced to +1 or −1, respectively and $\|\bullet\|^2$ refers to the length square of the indicated vector.

As discussed above, the exhaustive search suggested in (4) may soon become intractable, as the size of $\mathbb{X}$ grows exponentially as the constellation size and/or MIMO size increases. To resolve this problem, $\mathbb{X}$ is replaced by a list $\mathbb{L} \subset \mathbb{X}$ that covers the samples of x that are likely the major contributors to the maximization steps in (4).

Embodiments illustrated here use a search method for generation of a list $\mathbb{L}$. This list is subsequently used in the iterative MAP detector 106 of FIG. 1. The specific method that is introduced here is referred to as stochastic list generation (SLG). The subset of solutions $\mathbb{L}$, are the choices of s that are near the minimizer $\|y-Hs\|^2$.

Additional details are now illustrated. As described above, the following steps are taken to generate a set of $L_i$ independent samples.

(1) Find a sampling center: $s_{center}$=Wy where W is chosen to be the MMSE estimator matrix $$W = \left( H^H H + \sigma_n^2 I \right) H^H.$$

(2) Generate a perturbation vector v=Wv' where v' is a N×1 vector of independent and identically distributed Gaussian elements with zero mean and variance $$\rho \sigma_n^2$$

and ρ is a scaling parameter that controls the size of the sampling area.

(3) Generate a stochastic sample $\hat{s} = \lfloor s_{center} + v \rfloor$ where $\lfloor \bullet \rfloor$ denotes a hard decision to closest valid constellation point.

Steps 2 and 3 are repeated until a list of $L_i$ unique samples is obtained. This list is referred to herein as $\mathbb{L}$.

Since the MMSE solution $s_{center}$=Wy provides a sampling center that minimizes $\|y-Hs\|^2$, in a statistical sense, it should not be far from the ML solution $s_{ML}$.

$$s_{center} = WHs_{tx} + Wn \quad (4)$$

where the subscript 'tx' has been added to s to emphasize that it is the transmitted symbol vector. It should be noted that while the first term on the right-hand side of (4) comes from the transmitted symbol vector, the second term is a contributor from the channel noise. It may be further noted that with $W = W_{MMSE}$, this first term can be rearranged as $$WHs_{tx} = s_{tx} - \sigma_n^2 \left( H^H H + \sigma_n^2 I \right)^{-1} s_{tx} \approx s_{tx} \quad (5)$$

where the approximation to the second line here follows since for typical values of SNR the size of the term $$\sigma_n^2 \left( H^H H + \sigma_n^2 I \right)^{-1},$$

for most cases, vanishes to a negligible value, hence, may be ignored.

Substituting (5) into (4), $$s_{center} \approx s_{tx} + Wn \quad (6)$$

Random choices of v' and substitution of the result in v=Wv' and then in $\hat{s} = \lfloor s_{center} + v \rfloor$, for some choices of v' that fall close to −n can remove a good portion of Wn from $s_{center}$, leading to a set of desirable samples at the vicinity of stx, hence, near $s_{ML}$. The process of generating dependent samples that is introduced below will further improve the quality of the samples.

The preceding illustrates how independent samples are generated. The Following illustrates how dependent samples are generated. Thus, an additional step is illustrated for the sampling process that improves on the quality of the finalized samples at low additional computational complexity cost. From the equations above, $$Wv' = U1 \quad (7)$$

7

-continued where $$U = WV'$$ (8)

V'=diag[v'], i.e., the diagonal matrix whose diagonal elements are the elements of v', and 1 is a column vector of ones.

For any given sample of v, a sign change of the real or imaginary part of any element of v' results in another sample within the desired Gaussian distribution. The original sample v is designated as an independent sample, while any sign change of one or more elements in v' is considered as a dependent sample.

For each sample v', Embodiments first generate the independent sample $$\hat{s}_i = \lfloor s_{center} + U1 \rfloor$$ (9)

and, subsequently, a set of dependent samples $$\hat{s}_d = s_{center} + Ua$$ (10)

are generated. In (10), each choice of a is a vector with random elements of +1 or −1. Recalling that the length of a is N, there exist $2^N$ different choices for a, including the case of a=1. In some embodiments, the sign changes are applied to real and imaginary parts of elements of v', leading to $2^{2N}$ different choices of the vector v.

In an alternative embodiment, a subset of the choices for a are selected to keep the complexity of the receiver 104 lower.

Assuming that for each independent sample, $L_d$ dependent samples are generated, a total of $L_i(L_d+1)$ samples of s are obtained, after combining both independent and dependent samples in the list $\mathbb{L}$. Next, the top K distinct samples of s which result in the smallest values of $\|y-Hs\|^2$ are chosen as the finalized list $\mathbb{L}$ to be used in the iterative detection portion of the receiver 104. Accordingly, the LLR values in (4) are approximated by $$\lambda_k^e \approx \frac{1}{2} \max_{x \in \mathbb{L}^{k+}} \left\{ -\frac{1}{\sigma^2}\|y - Hs\|^2 + x_{\backslash k}^T \cdot \lambda_{\backslash k}^a \right\} -$$ (11)

$$\frac{1}{2} \max_{x \in \mathbb{L}^{k-}} \left\{ -\frac{1}{\sigma^2}\|y - Hs\|^2 + x_{\backslash k}^T \cdot \lambda_{\backslash k}^a \right\}$$

In some embodiments the number of dependent samples, $L_d$ are set to be equal to the MIMO size N. These particular choices of a vectors are implemented as an engineering compromise reducing the complexity of generation of dependent samples. This can be understood by noting that an independent sample is obtained by letting a=$a_0$=1 in (10), and the subsequent dependent samples are obtained by using a1 through $a_N$. Moreover, making note of the fact that $a_0$-$a_i$, for i=1, 2, . . . , N, are a set of vectors with one non-zero entry, equal to 2, the ith dependent value of the vector v can be obtained as $v_i$=$v_0$-U($a_0$-$a_i$)=$v_0$-2$u_i$, where $v_0$=U$a_0$ is the independent value of v and $u_i$ is the ith column of U. This can be implemented through a set of shift and subtract operations. Indeed, in some embodiments, this may be implemented in a fashion where no multiplication is involved.

In alternative embodiments at the other extreme, a more diversified set of dependent samples can be obtained if embodiments use all permutations of signs of real and imaginary parts of element of v'. There are $2^{2N}$-1 such permutations, hence, the number of dependent samples, for each independent sample, may be increased to as large as $2^{2N}$-1. This can lead to a performance improvement at a cost of significant increase in computational cost. Thus, the values of $L_d$ may be selected based on engineering considerations where smaller values of $L_d$ may be preferred as a compromised choice resulting in lower performance, but corresponding lower computational cost than when larger values of $L_d$ are used.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Referring now to FIG. 3, a method 300 is illustrated. The method 300 includes acts for recovering transmitted symbols. While the method is set forth using various variables and symbols, it should be appreciated that this is merely for convenience of explanation and the use of other symbols and variables having the same functionality are contemplated to be within the scope of the claims as claimed.

The method 300 includes receiving a signal comprising a codeword, the signal having been affected by channel effects including distortion and noise (act 310).

The method 300 further includes identifying a solution space for recovering the transmitted symbols (act 320). Identifying a solution space, in one example embodiment, comprises finding a sampling center using a full matrix W for minimum mean square error.

The method 300 further includes generating a vector (act 330). In this example, the vector is referenced as v' is used to generate noise, and has a variance $$p\sigma_n^2 \text{ where } \sigma_n^2$$

is a factor that defines power of added noise and where $\rho$ is a scaling parameter that controls a size of a noise sampleable space.

The method 300 further includes applying the vector v to the solution space (act 340).

The method 300 further includes gathering original samples from the solution space, which includes noise from the vector v' and symbol information from the received signal to find probabilities for symbols (act 350).

The method 300 further includes using the probabilities, recovering the symbols (act 360).

Figure 2:
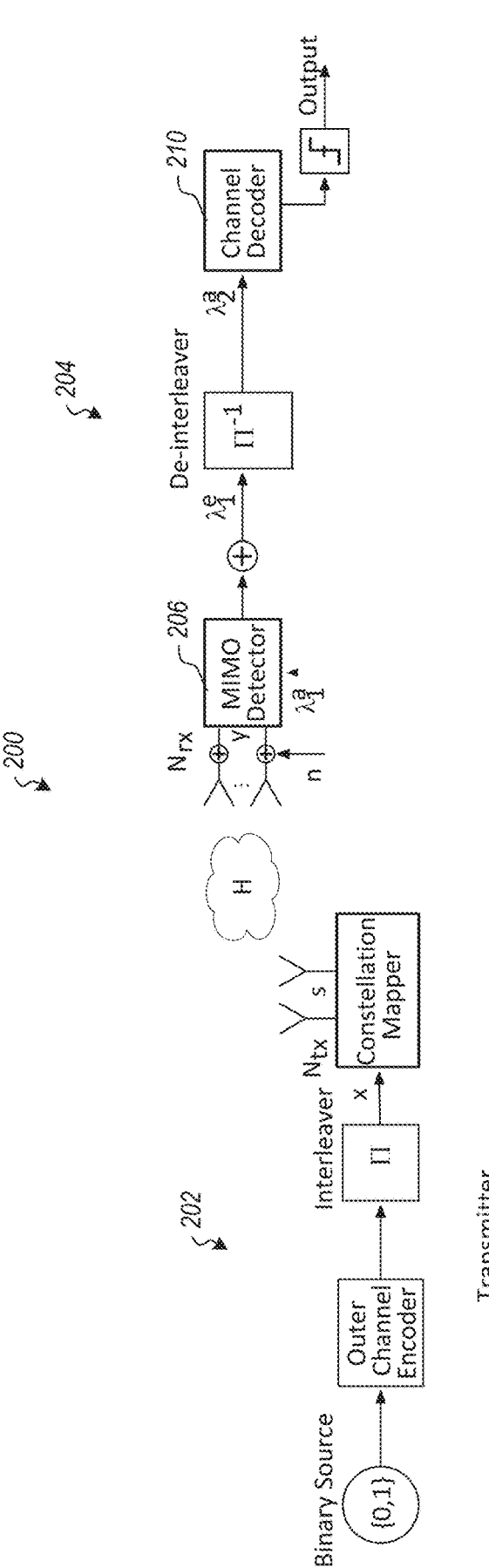
FIG. 2 illustrates an alternative MIMO system.

The method 300 described up to this point has been illustrated as a method of obtaining independent samples. Further, the particular method shown does not incorporate some of the iterative elements described above for certain embodiments. Thus, the method 300 up to this point may be practiced in an alternative MIMO system 200 illustrated in FIG. 2, showing a transmitter 202, receiver 204, detector 206, de-interleaver 208 and channel decoder 210.

However, the method 300 may further include elements for collecting dependent samples. For example, the method 300 may include obtaining a change vector. For example, the change vector may be a vector constructed from v' but where a sign change of any element of v' results in another sample within a desired Gaussian or other distribution. In such an example, the change vector is applied to the vector to create a dependent vector. Embodiments apply the dependent vector to the solution space to generate additional samples different from the original samples. The additional samples are gathered from the solution space to find additional probabilities for symbols. In this case, recovering the symbols comprises using the probabilities and the additional probabilities.

The method 300 may be practiced where the vector v' comprises a zero mean.

The method 300 may be practiced where the vector v' comprises independent and identically distributed random variables.

The method 300 may be practiced where the vector v' comprises Gaussian white noise.

The method 300 may be practiced where applying the perturbation vector v to the solution space comprises translating the vector v' to the sample space using the full matrix W.

The method 300 may be practiced where the probabilities are expressed as log likelihood ratios.

The method 300 may be practiced where gathering samples from the solution space comprises using stochastic sampling.

The method 300 may be practiced where gathering samples from the solution space comprises using iterative stochastic sampling.

The method 300 may be practiced where gathering samples from the solution space comprises using $$\lambda_k^e \approx \frac{1}{2} \max_{x \in \mathbb{X}^{k+}} \left\{ -\frac{1}{\sigma^2} \|y - Hs\|^2 + x_{\setminus k}^T \cdot \lambda_{\setminus k}^a \right\} -$$
$$\frac{1}{2} \max_{x \in \mathbb{X}^{k-}} \left\{ -\frac{1}{\sigma^2} \|y - Hs\|^2 + x_{\setminus k}^T \cdot \lambda_{\setminus k}^a \right\}.$$

The method of claim 1, wherein gathering samples from the solution space comprises using $$\lambda_k^e \approx \frac{1}{2} \max_{x \in \mathbb{L}^{k+}} \left\{ -\frac{1}{\sigma^2} \|y - Hs\|^2 + x_{\setminus k}^T \right\} - \frac{1}{2} \max_{x \in \mathbb{L}^{k-}} \left\{ -\frac{1}{\sigma^2} \|y - Hs\|^2 + x_{\setminus k}^T \right\}.$$

The method 300 may be practiced where $$W = \left( H^H H + \sigma_n^2 I \right)^{-1} H^H.$$

The method 300 may be practiced where ρ=4.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of recovering transmitted symbols, the method comprising:

receiving a signal comprising a codeword, the signal having been affected by channel effects including distortion and noise;

identifying a solution space for recovering the transmitted symbols, wherein identifying a solution space comprises finding a sampling center using a full matrix W for minimum mean square error;

generating a vector v', to generate noise, having a variance $\rho\sigma_n^2$ where $\sigma_n^2$ is a factor that defines power of added noise and where $\rho$ is a scaling parameter that controls a size of a noise sampleable space;

applying the vector v' to the solution space;

gathering original samples from the solution space, which includes noise from a perturbation vector v' and symbol information from the received signal to find probabilities for symbols; and using the probabilities, recovering the symbols.

2. The method of claim 1, further comprising:

obtaining a change vector;

apply the change vector to the vector to create a dependent vector;

apply the dependent vector to the solution space to generate additional samples different from the original samples;

gathering the additional samples from the solution space to find additional probabilities for symbols; and wherein recovering the symbols comprises using the probabilities and the additional probabilities.

3. The method of claim 1, wherein the vector v' comprises a zero mean.

4. The method of claim 1, wherein the vector v' comprises independent and identically distributed random variables.

5. The method of claim 1, wherein the vector v' comprises Gaussian white noise.

6. The method of claim 1, wherein applying the vector v' to the solution space comprises translating the vector v' to the sample space using the full matrix W.

7. The method of claim 1, wherein the probabilities are expressed as log likelihood ratios.

8. The method of claim 1, wherein gathering samples from the solution space comprises using stochastic sampling.

9. The method of claim 1, wherein gathering samples from the solution space comprises using iterative stochastic sampling.

10. The method of claim 1, wherein gathering samples from the solution space comprises using $$\lambda_k^e \approx \frac{1}{2}\max_{x\in\mathbb{X}^{k+}}\left\{-\frac{1}{\sigma^2}\|y-Hs\|^2 + x_{\backslash k}^T\cdot\lambda_{\backslash k}^a\right\} - $$
$$\frac{1}{2}\max_{x\in\mathbb{X}^{k-}}\left\{-\frac{1}{\sigma^2}\|y-Hs\|^2 + x_{\backslash k}^T\cdot\lambda_{\backslash k}^a\right\}.$$

11. The method of claim 1, wherein gathering samples from the solution space comprises using $$\lambda_k^e \approx \frac{1}{2}\max_{x\in\mathbb{L}^{k+}}\left\{-\frac{1}{\sigma^2}\|y-Hs\|^2 + x_{\backslash k}^T\right\} - \frac{1}{2}\max_{x\in\mathbb{L}^{k-}}\left\{-\frac{1}{\sigma^2}\|y-Hs\|^2 + x_{\backslash k}^T\right\}.$$

12. The method of claim 1, wherein $$W = \left(H^H H + \sigma_n^2 I\right)^{-1} H^H.$$

13. The method of claim 1, wherein $\rho=4$.

14. A computing system comprising:

one or more processors; and one or more non-transitory computer-readable media having stored thereon instructions that are executable by the one or more processors to configure the computer system to recover transmitted symbols, including instructions that are executable to configure the computer system to perform at least the following:

receive a signal comprising a codeword, the signal having been affected by channel effects including distortion and noise;

identify a solution space for recovering the transmitted symbols, wherein identifying a solution space comprises finding a sampling center using a full matrix W for minimum mean square error;

generate a vector v', to generate noise, having a variance $$\rho\sigma_n^2 \text{ where } \sigma_n^2$$

is a factor that defines power of added noise and where p is a scaling parameter that controls a size of a noise sampleable space;

apply the vector v' to the solution space;

gather original samples from the solution space, which includes noise from the vector v' and symbol information from the received signal to find probabilities for symbols; and using the probabilities, recover the symbol.

15. The computing system of claim 14, wherein the one or more non-transitory computer-readable media further have stored thereon instructions that are executable by the one or more processors to configure the computer system to perform at least the following:

obtain a change vector;
    apply the change vector to the vector to create a dependent vector;
    apply the dependent vector to the solution space to generate additional samples different from the original samples;
    gather the additional samples from the solution space to find additional probabilities for symbols; and
    wherein recovering the symbols comprises using the probabilities and the additional probabilities.

16. The computing system of claim 14, wherein gathering samples from the solution space comprises using stochastic sampling.

17. The computing system of claim 14, wherein gathering samples from the solution space comprises using iterative stochastic sampling.

18. A receiver comprising:

a MIMO detector configured to receive a signal comprising a codeword, the signal having been affected by channel effects including distortion and noise;
    a channel decoder coupled to the MIMO detector, the channel decoder configured to perform the following:
        identify a solution space for recovering transmitted symbols, wherein identifying a solution space comprises finding a sampling center using a full matrix W for minimum mean square error;
        generate a vector v', to generate noise, having a variance

14

$$\rho\sigma_n^2 \text{ where } \sigma_n^2$$

is a factor that defines power of added noise and where p is a scaling parameter that controls a size of a noise sampleable space;
    apply the vector v' to the solution space;
    gather original samples from the solution space, which includes noise from the vector v' and symbol information from the received signal to find probabilities for symbols; and
    using the probabilities, recover the symbols.

19. The receiver of claim 18, further comprising a feedback loop, and wherein the channel decoder is configured to perform iterative stochastic sampling.

20. The receiver of claim 18, wherein the channel decoder is further configured to perform the following:

obtain a change vector;
    apply the change vector to the vector v' to create a dependent vector;
    apply the dependent vector to the solution space to generate additional samples different from the original samples;
    gather the additional samples from the solution space to find additional probabilities for symbols; and
    wherein recovering the symbols comprises using the probabilities and the additional probabilities.

* * * * *